WILLIAM HALOPOFF
INVENTOR.

BY
Beehler & Arant
ATTORNEYS

INVENTOR.
WILLIAM HALOPOFF
BY
Beehler & Arant
ATTORNEYS

INVENTOR.
WILLIAM HALOPOFF
BY
Beehler & Arant
ATTORNEYS

WILLIAM HALOPOFF
INVENTOR.

BY

Beehler & Arant
ATTORNEYS

INVENTOR.
WILLIAM HALOPOFF
BY
Beehler & Arant
ATTORNEYS

United States Patent Office 3,555,590
Patented Jan. 19, 1971

3,555,590

HARDWARE AND DEVICES FOR ADJUSTING THE SPRING TENSION IN A COUNTERBALANCE HINGING SYSTEM

William Halopoff, Monterey Park, Calif., assignor to Holmes Hardware & Sales Co., Los Angeles, Calif., a co-partnership Filed Sept. 20, 1968, Ser. No. 761,260
Int. Cl. B25b *27/00;* E05f *1/12*
U.S. Cl. 16—1 9 Claims

ABSTRACT OF THE DISCLOSURE

An overhead garage door hinging system having a spring fastener for adjustably coupling counterbalance springs to a power arm. The spring fastener includes a pair of side plates between which the power arm is pivotably mounted through one of a plurality of holes in the power arm. A plurality of openings are so spaced along the side plates that each of the openings are aligned with a different one of the holes in the power arm at one position of the hinging system; whereby the points of attachment of the springs to the power arm may be changed without disconnecting the springs. The counterbalance springs are connected to the garage structure by means including a spring-connecting member and a slotted mounting bracket which are adapted for accommodating a tension-adjusting tool for repositioning the connecting member, and therefore adjusting the tension of the springs. A spring spreader, having spring-connection lugs mounted on a shaft so as to convert rotational motion of the shaft into linear displacement of the lugs, is provided for conveniently installing the counterbalance springs. A mounting member positioning tool is further provided for releasably engaging one leg of a mounting bracket of the hinging system, so that the garage door may be detached and reinstalled without disconnecting the springs from the system.

This invention relates to hardware and devices for adjusting the tension in counterbalance hinging systems, especially in connection with overhead garage door hinging systems using counterbalance springs; and to tools for mounting the hinging system to the garage structure.

Overhead garage doors hinging systems conventionally employ counterbalance springs which are attached to a power arm that controls the opening and closing operations of the door. For the hinging system to operate efficiently it is necessary among other things that the tension of the springs and the point of attachment of the springs to the power arm be properly selected. The correct value of these just-mentioned parameters is a function of the weight of the door and of the geometry of the hinging installation, and are difficult to ascertain exactly other than by trial and error means. Heretofore it has been necessary to disconnect the springs from the system to adjust either the tension or the point of attachment of the springs. Further, prior to the subject invention the operation of connecting the springs to the hinging system has proven troublesome and dangerous, and the springs could therefore only be practically installed with the door in the position that produced the least amount of spring tension. Also, heretofore, the counterbalance springs had to be disconnected and then reconnected to the hinging system if for any reason the garage door should have to be detached and reinstalled.

It is therefore one of the objects of the invention to provide new and improved hardware for a counterbalance hinging system by means of which the effective length of the counterbalance lever arm may be adjusted without disconnecting the source of counterbalance force.

Another object of the subject invention is to provide new and improved counterbalance spring attachment means whereby the tension of the springs in an overhead hinging system may be adjusted without disconnecting the springs from the system.

Still another object of the invention is to provide an improved device for spreading counterbalance springs so that the springs may be easily and safely installed into a counterbalance hinging system.

A further object is to provide a device for easily and efficiently adjusting the tension of the counterbalance springs in an overhead hinging system, said device being adapted to be used in conjunction with the tension-adjustable hardware of the invention.

Yet another object of the subject invention is to provide a device for positioning a mounting member of an overhead garage door hinging system so that the door may be installed or removed while the hinging system is still connected to the source of counterbalance force.

With these and other objects in view, the invention consists in the construction, arrangement and combination of the various parts of the device, whereby the objects contemplated are attained, as hereinafter set forth, and pointed out in the appended claims and illustrated in the accompanying drawings.

Figures 1, 2, 3:
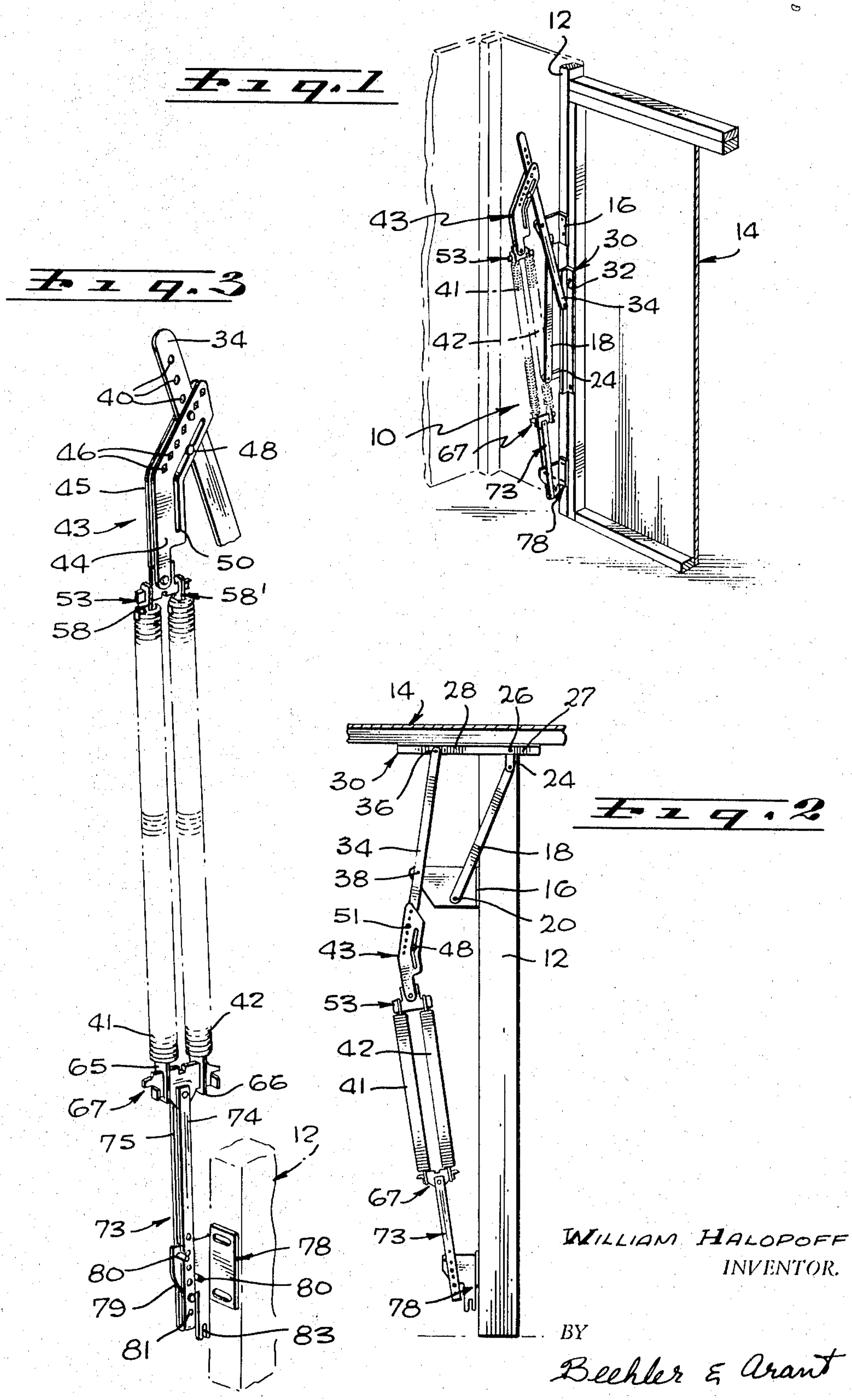
FIG. 1 is a perspective view of a portion of a garage structure showing a counterbalance hinging system, incorporating the tension-adjustable hardware of the subject invention, attached to the structure and with the door in the closed position.
FIG. 2 is a side view of the garage structure and hinging system of FIG. 1 with the garage door in the open position.
FIG. 3 is a side perspective view of tension-adjustable hardware connecting counterbalance springs to the garage structure and to a power arm of the hinging system.

In an embodiment of the invention chosen for the purpose of illustration, one hinging system 10 of a set of garage door hardware is shown mounted to a jamb 12 and to a garage door 14. The garage door hardware selected to have the novel tension adjustable hardware incorporated therein has been in use for a substantial period of time, but it will be described in some details as comprising a typical environment for the inventive subject matter.

Referring first primarily to FIGS. 1 through 9, the hinging system 10 includes a jamb plate 16 attached to the jamb 12 by any conventional means. A short arm 18 is pivotally secured by a pin 20 to the jamb plate at one end of the arm and pivotally secured by a pin 22 to a gusset plate 24. The gusset plate in turn is attached by means of rivet 26 to one leg 28 of an angle iron 30. The other leg of the angle 30 is attached to the inside face of the door 14 by appropriate fastening means such as bolts or leg screws 32.

A second longer arm 34, often designated as a power arm, is pivotally secured at one end by means of a pin 36 to the leg 28 of the angle iron 30. The arm 34 is also pivotally mounted by means of a pin 38 to the jamb plate 16 at a point downwardly with respect to the midpoint of the arm. At the end of the power arm 34 remote from its point of attachment to the door is a series of holes 40 which serve the purpose of adjustment, that is to say these holes 40 provide different locations at which parallel coil springs 41 and 42 may be attached to the power arm 34. To secure these springs to a suitable point of attachment on the power arm 34, a spring fastener fitting 43 is provided.

Figures 4, 5, 6, 7, 8, 9:
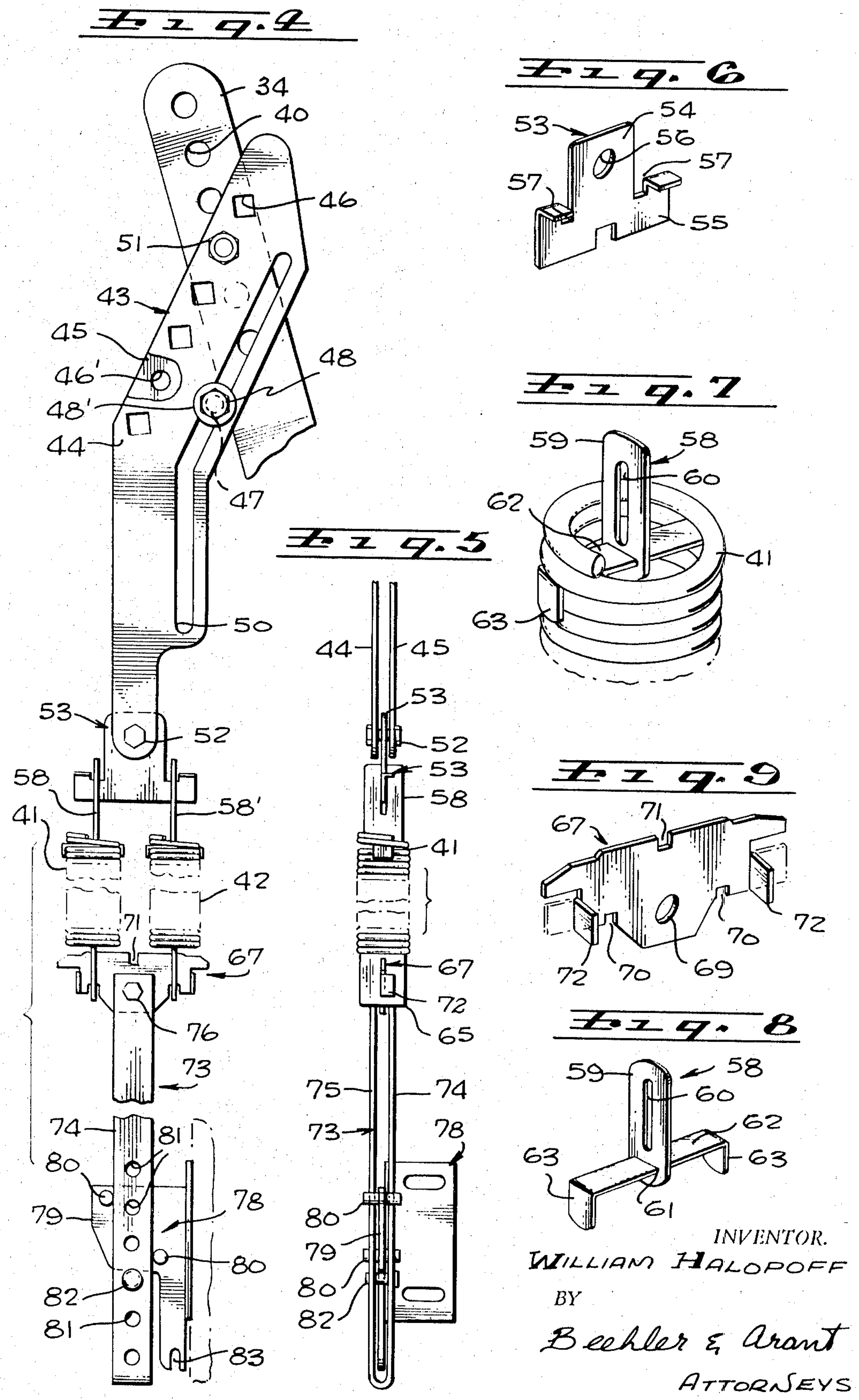
FIG. 4 is an enlarged fragmentary side view of the tension-adjustable hardware of FIG. 3.
FIG. 5 is an end view of a portion of the tension-adjustable hardware of FIGS. 3 and 4.
FIG. 6 is a side perspective view of a spring hanger for parallel coupling a pair of counterbalance springs.
FIG. 7 is a perspective view of a spring connector mounted to a section of a coil spring.
FIG. 8 is a perspective view of the spring connector of FIG. 7.
FIG. 9 is a perspective view of another embodiment of a spring hanger for parallel coupling a pair of counterbalance springs.
Figure 10:
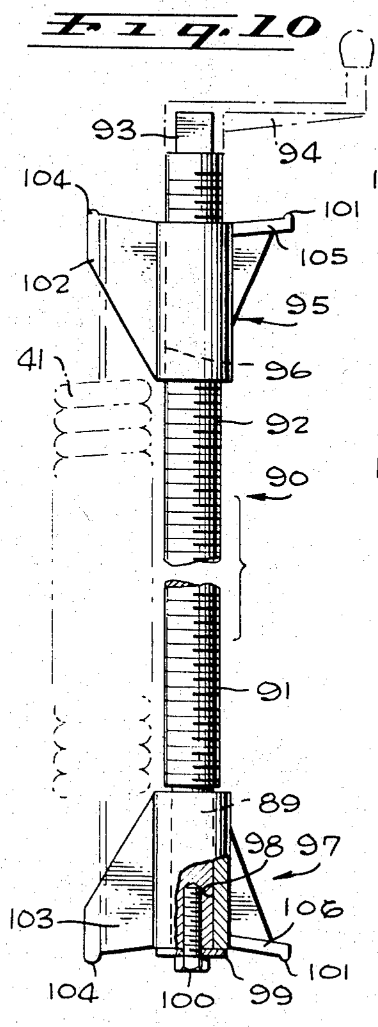
FIG. 10 is a fragmentary side view of a spring spreader in accordance with the invention, with a pair of coil springs attached thereto.

As seen best in FIGS. 3 through 5, the fastener 43, in accordance with the subject invention, comprises a pair of angled side plates 44 and 45. The plate 44 has a plurality of rectangularly shaped openings 46, and the plate 45 a plurality of circular openings 46′ formed adjacent to the upper edges of the end of the plates adjacent to the power arm 34. An annular spacing member 47 is mounted between the side plates 44 and 45 in elongated slots 50 by means of a bolt 48 and a washer 48′. The slots 50 are formed in both of the side plates adjacent to lower edges thereof, and the side plates 44 and 45 are spaced apart by the member 47 a distance compatible to the thickness of the power arm 34 so that the power arm 34 may be freely, pivotally connected between the plates by means of a bolt 51. There is a spacer bushing (not shown) which extends through one or another of the holes 40 to fix the distance between the side plates. It is important to note that the spacing between the opening 46 in the fastener 43, relative to the spacing between the holes 40 in the power arm 34, is such that each of the plurality of holes 40 may be aligned with a different one of the plurality of openings 46 during one position of rotation of the power arm 34. Further, in the selected embodiment the lateral spacing between the series of openings 46 and 46′ and the slots 50 is such that when the hinging system 10 is in the open position and the power arm is adjacent to the top surface of the spacing member 47 (FIG. 2) then the holes 40 are in substantial alignment with the openings 46. As noted previously, this is one of the important advantages of the subject invention because due to the alignment of the holes 46 and openings 40, all that is required in order to change the point of connetcion of the spring fastener 43 to the power arm 34 effective to the length of the pivot arm is to insert a bolt 51′ (not shown) into a different one of the holes 41 and openings 40, and then remove the bolt 51. This just described adjustment procedure may be accomplished without disconnecting the springs 41 and 42 from the main portions of the hinging system thereby greatly expediting one of the hanging adjustments required in installations for overhead garage doors.

The spacing member 47 is made adjustable along the angled slots 50 so that the position of the door 14 at the time of engagement between the member 47 and the power arm 34 may be varied. The position of the spacing member 47 may be adjusted for example, so that the power arm engages the member 47 after approximately three-quarters of the downward travel of the door. This engagement of the spacing member 47 by the arm 34 operates to change the angle of contact between the fastener 43 and the power arm 34, thereby increasing the effective counterbalance force applied to the arm during the period of travel of the door requiring such an increase in force.

Suspended between the side plates 44 and 45 by means of a bolt or pin 52 is an upper spring hanger 53 having a vertical section 54 and a transverse section 55. A mounting hole 56 is formed in the vertical section 54 and a pair of notches 57 are provided in the transverse section 55 with a different one of said notches being disposed on different sides of and contiguous to said vertical section 54. The upper ends of the coil springs 41 and 42 are connected to the hanger 53 by means of spring connectors 58 and 58′, respectively which connectors engage the notches 57. Referring momentarily to FIG. 8, the spring connectors 58 and 58′ are shown as comprising a plate 59 having an elongated slot 60 and a transverse slot 61. A plate 62 is positioned through the slot 61 and then flanges 63 are formed at the end portions thereof. As shown best in FIG. 7, the spring connector 58 may be threaded into the coil spring, such as 41, so as to be retained between the first and second coils, for example, of the spring.

The lower ends of the springs 41 and 42 are secured by spring connectors 65 and 66 which may be similar to the spring connector 58 just described.

As seen best in FIG. 9 the lower spring hanger 67 comprises a plate having a mounting hole 69 formed in a lower truncated triangularly shaped section, a pair of notches 70 in the lower edge on opposite sides of the mounting hole 69 and a notch 71 formed in the central portion of the top edge. The opposite end portions of the top edge of the hanger 67 are stair-stepped and the ends of the hanger are slotted so as to form a pair of tabs 72. The springs 41 and 42 are attached to the lower spring hanger 67 by spring connectors 65 and 66 and are securely retained in position by means of the notches 70 and the tabs 72, which tabs are bent transverse to the plate of the hanger 67 after the spring connectors 65 and 67 are mounted thereto.

A connecting member 73 comprises a pair of side members 74 and 75, one end of which are mounted adjacent to opposite faces of the lower spring hanger 67 by a pin 76. At the other end of the connecting member 73 remote from the spring hanger 67, a series of adjustment holes 81 are formed in each of the side members 74 and 75. A bracket 78 which is mounted on the jamb 12 by conventional fastening means has an L-shaped flange 79 which carries a pair of laterally disposed alignment pins 80. The connecting member 73 which is closed at the bottom end, is installed into the hinging system 10 by first positioning the side members 74 and 75 adjacent to opposite faces of the flange 79 and between the alignment pins 80; and by then connecting the member 73 to the lower spring hanger 67. The connecting member 73 is retained beneath the lower edge of the flange 79 by means of a bolt 82 inserted through one of the pairs of adjustment holes 81, and by the force exerted by the springs 41 and 42. The flange 79 has a slot 83 in the lower edge thereof, adjacent to the jamb 12, and this slot is provided so that the tension of the springs 41 and 42 may be readily adjusted by means of a tension adjusting tool to be described subsequently.

One method of installing a source of counterbalance force such as the springs 41 and 42 into an overhead hinging system such as the system 10, for example, is by use of a spring spreader shown in FIGS. 10 through 17. According to the embodiment shown in FIGS. 10 and 11, a spring spreader 90 includes a shaft 91 having a threaded upper portion 92 and a rectangular head 93, with the head 93 adapted for engaging a crank 94. A lower section of the shaft 91 is of a reduced diameter and unthreaded. An upper spring connection fixture 95, having a threaded bore 96, is rotatably mounted on the threaded portion 92 of the shaft so that the fixture 95 moves linearly in response to rotation of the shaft 91. A lower spring connection fixture 97 has an unthreaded bore 98 into which the lower section 89 of the shaft 91 is rotatably mounted and retained by means of a cap 99 and a bolt 100. On one side of the fixtures 95 and 97 are lugs 102 and 103, respectively, with each lug having a lip 104 formed around the outer periphery thereof. On another side of the fixtures 95 and 97 are mounted protruding pins 105 and 106, respectively, with each pin having a lip 101 formed on the outermost portion thereof.

In installation of counterbalance springs such as springs 41 and 42 to a hinging system such as system 10 by means of the spring spreader 90, the system is first assembled except, for example, pin connections 52 and 76 (FIG. 4). The fixtures 95 and 97 of the spreader 90 are first positioned between the hangers 53 and 67 with the lug 103 being aligned in the notch 71 of the lower hanger 67. The shaft 91 may then be rotated by means of the crank 94 or any suitable device such as a power driven socket drive, until the springs are stretched to the proper position so that the mounting holes 56 and 69 in the hangers are in alignment with the corresponding holes in the spring fastener 43 and the connecting member 73, respectively. The spring assembly installation is then completed by installing the pins 52 and 76 and removing the spring stretcher 90. It should be noted that by means of the spring stretcher in accordance with the subject invention, that the springs may be installed with the hinging system in either the up (the least spring tension) or the down (maximum spring tension) position. In hinging systems utilizing a single spring 107, the spring may be connected between the pins 105 and 106 by the slot 60 in the spring connectors 58, for example, and installed in a simple manner to that just described for the dual spring system.

Figure 13:
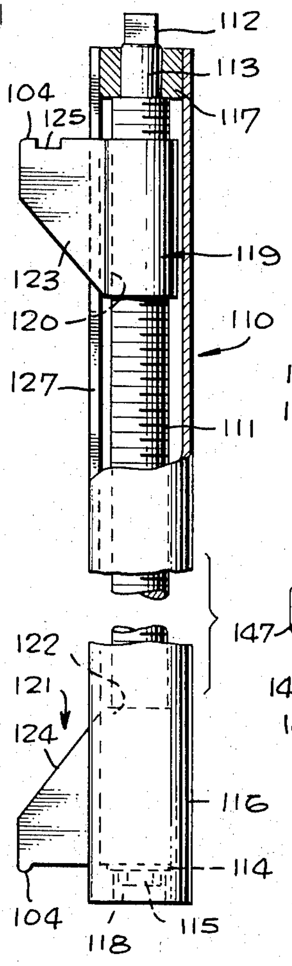
FIG. 13 is a side fragmentary view of the second embodiment of the spring spreader.
Figure 14:
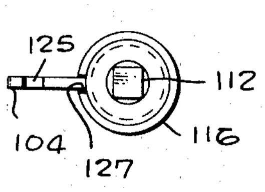
FIG. 14 is a top view of the spring spreader of FIG. 13.
Figure 12:
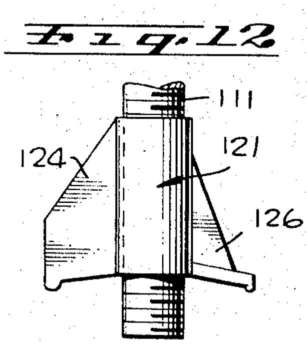
FIG. 12 is a side view of a portion of a second embodiment of a spring spreader showing the lower spring connection fixture mounted on a threaded shaft.

In a second embodiment, a spring spreader 110 shown in FIGS. 12, 13 and 14 has a threaded shaft 111 with a head 112 and an upper section of reduced diameter 113. A cap 114 is mounted in the lower end of the shaft 111 by means of a bolt 115, and the shaft is rotatably mounted in a tubular housing 116 by means of bushings 117 and 118. An upper spring connection fixture 119 is rotatably mounted to a top section of the shaft 111 by means of a threaded bore 120 and a lower spring connection fixture 121, having a threaded bore 122, is rotatably mounted to a lower portion of the shaft. Lugs 123 and 124 of the fixtures 119 and 121, respectively, are similar to those described for the spring spreader 90 except that the lug 123 has a notch 125 formed therein. It is noted that in the embodiment shown in FIG. 13 that the fixtures 119 and 121 do not carry mounting pins such as pins 105 and 106 of the spreader 90. However, it will be understood that similar type pins may be utilized in the embodiment of FIG. 13, as indicated in FIG. 12 which shows the spring connection fixture 121 onto which a mounting pin 126 has been attached. The housing 116 has vertical slots 127 formed therein alignment with the lugs 123 and 124 so as to allow for vertical movement of the lugs. An important feature of the spring spreader 110 is that the upper and lower portions of the shaft 111 are oppositely threaded so that as the head 112 is rotated in one direction the lug 123 moves in an upward direction while the lug 124 moves in a downwardly direction, for example. The spring spreader 110 may be utilized for the installation of multiple or single coil springs in a manner similar to that described for the spreader 90. The notch 125 in the lug 123 provides added stability by aligning with the lower surface of the spring hanger, such as the hanger 53.

Figure 15:
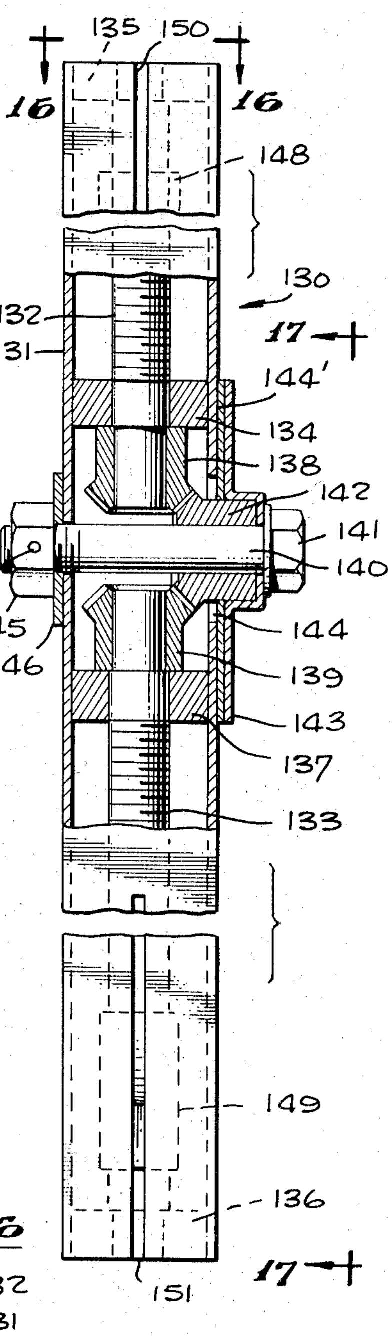
FIG. 15 is a side view of a third embodiment of a spring spreader according to the subject invention.
Figure 11:
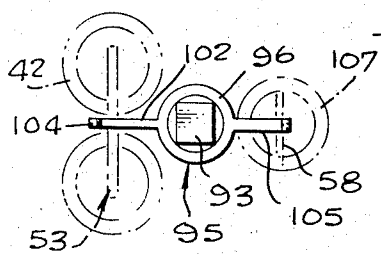
FIG. 11 is a top view of the spring spreader of FIG. 10 with coil springs attached thereto.
Figure 16:
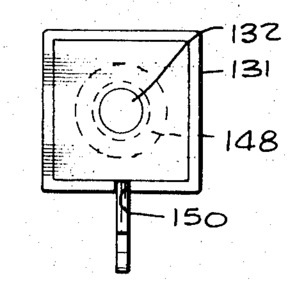
FIG. 16 is a cross-sectional view taken on the line 16—16 of FIG. 15.
Figures 17, 18, 19:
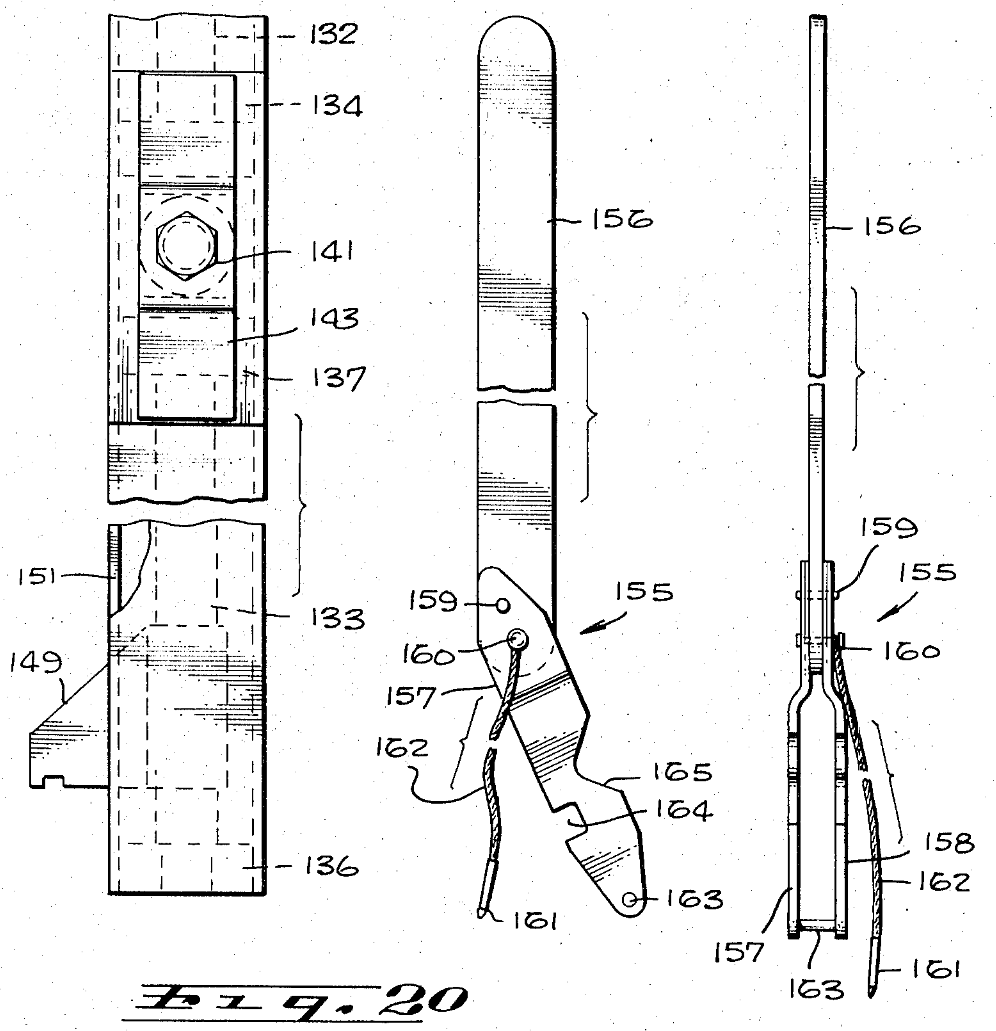
FIG. 17 is a cross-sectional view taken on the line 17—17 of FIG. 15.
FIG. 18 is a side view of a spring tension adjusting device in accordance with the subject invention.
FIG. 19 is a front view of the spring tension adjusting device of FIG. 18.

According to another embodiment, a spring stretcher 130 shown in FIGS. 15 through 17 includes a housing 131, an upper threaded shaft 132, and a lower threaded shaft 133. The upper threaded shaft 132 is rotatably mounted in the housing 131 by means of bushings 134 and 135. The lower threaded shaft 133 is rotatably mounted in the housing 131 by means of bushings 136 and 137. Bevel gears 138 and 139 are rigidly attached to the shafts 132 and 133, respectively, at the ends of the shafts which are adjacent to the central portion of the housing 131.

A bolt 140 has a head 141, and a bevel gear 142 is rigidly attached to the shaft of the bolt 140 and a cover 143 is disposed between the gear 142 and the head 141. The bolt 140 is inserted into an opening 144 in a central portion of the housing 131 so that the gear 142 engages the gears 138 and 139. The opening 144 is closed on the right side by the cover 143 and a gasket 144', and on the left side by a nut 145 and a seal 146. The nut 145 is not firmly tightened against the housing 131, and is pinned by a pin 147 so that the bolt, nut and gear assembly 140, 145 and 142, respectively, are free to rotate in response to the torque applied to either the head 141 or to the nut 145. Upper spring connection fixture 148 and lower spring connection fixture 149 are similar to the fixture 119 described previously and have threaded bores rotatably mounted on the shafts 132 and 133, respectively. Vertical slots 150 and 151 are formed in a side of the housing 131 so as to be in alignment with the lugs of the fixtures 148 and 149, respectively.

The spring spreader 130 may be utilized for the insulation of either single of dual coil springs in a manner similar to that described for spring spreaders 90 and 110 described previously. Due to the unique construction of the spreader 130, rotational torque applied in a first direction from a power driven lug wrench, for example, to the head 141 will cause the fixtures 148 and 149 to move in a first linear direction, so as to separate for example. Rotational torque applied in the first direction but to the nut 145 will cause the fixtures 148 and 149 to move in an opposite direction, so as to close the distance therebetween for example. Therefore, the spring stretcher 130 may be expanded or contracted by a source of driving torque rotating in only a single direction.

Figure 20:
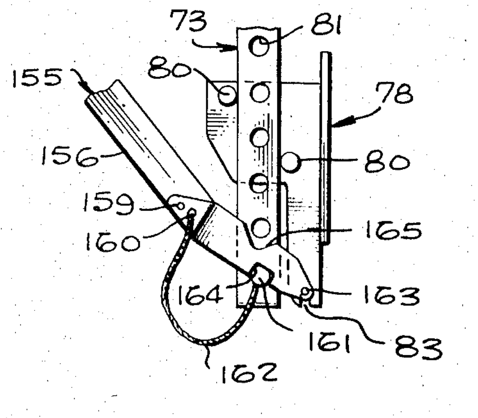
FIG. 20 is a side view of the tension adjusting device of FIGS. 18 and 19, positioned in association with the adjustable hardware of the invention so that a connecting member of the hardware may be adjusted thereby.
Figures 21, 22, 23, 24, 25, 26, 27:
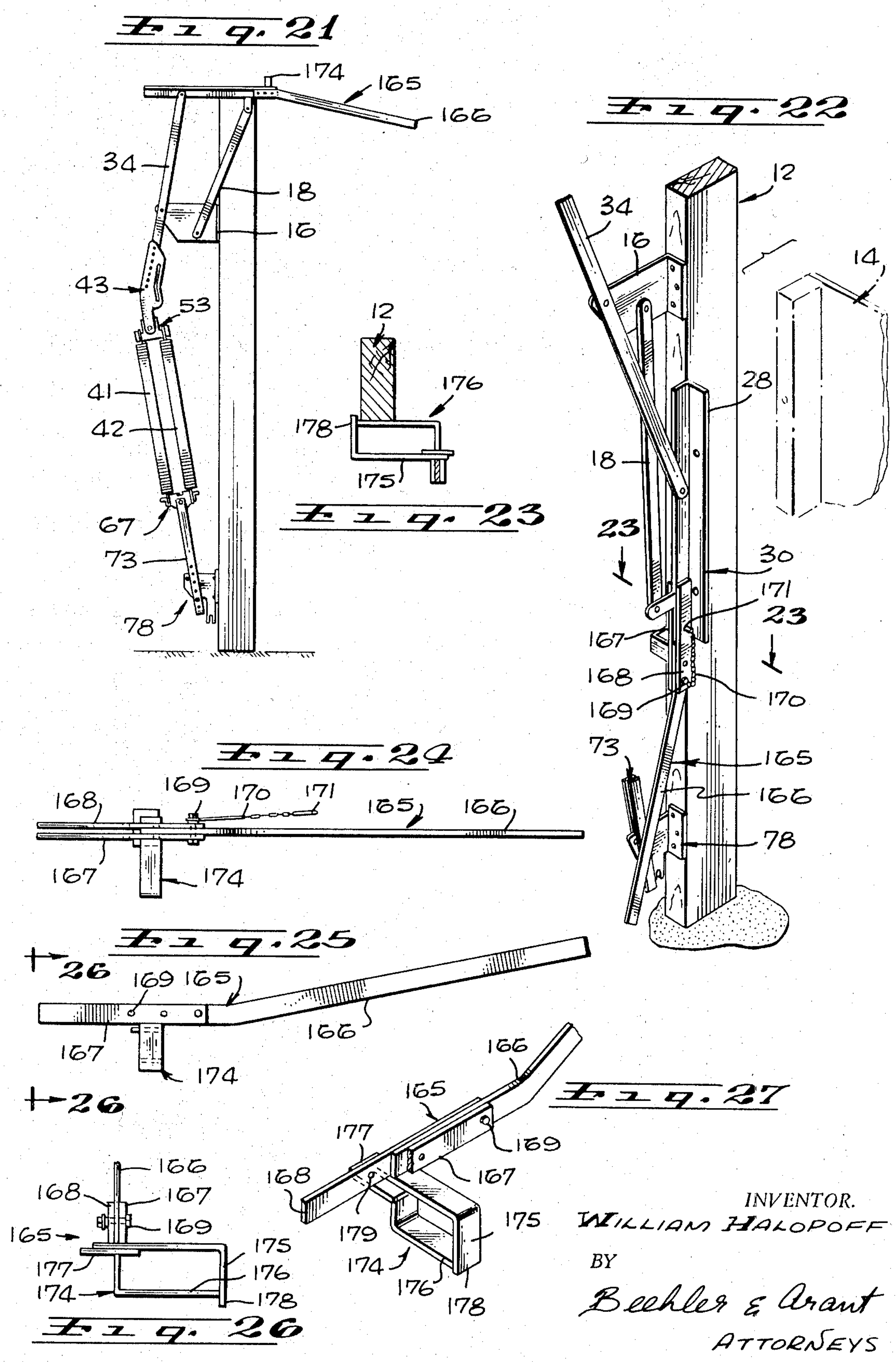
FIG. 21 is a side view of the counterbalance overhead hinging system in an open position, with a positioning tool attached to a garage door mounting angle.
FIG. 22 is a perspective view of a counterbalance overhead hinging system mounted to a jamb and retained in a closed position by the positioning tool of FIG. 21.
FIG. 23 is a cross-sectional view taken on the line 23—23 of FIG. 22.
FIG. 24 is a bottom view of the positioning tool of FIGS. 21 and 22.
FIG. 25 is a side view of the positioning tool shown in FIG. 24.
FIG. 26 is a front view of the positioning tool shown in FIGS. 24 and 25.
FIG. 27 is a partially cut away perspective view of the positioning tool shown in FIGS. 24 through 26.

After the hinging system 10 has been installed, adjustment of the tension of the counterbalance springs such as springs 41 and 42 may be conveniently and efficiently performed by means of a tension adjustment tool 155, shown in FIGS. 18 through 20. Tool 155 comprises a handle 156 with a pair of side plates 157 and 158 angularly attached thereto by means of pins 159 and 160. The pin 160 also attaches an adjustment pin 161 to the tool 155 by means of a wire cable 162. The end of the plates 157 and 158 remote from the handle 156 are joined by a connecting pin 163 and each plate is outwardly flanged so that the spacing between the plates at the pinned end is greater than at the handle end. A notch 164 in the lower edge of both of the plates 157 and 158 is so located relative to the pin 163 that the distance from the center of the notch 164 to the pin 163 is approximately equal to the lateral distance from the center of the slot 83 to the vertical centerline between the alignment pins 80 (see FIGS. 4 and 20). A concave opening 165 is formed in the upper edge of both of the side plates 157 and 158 with the center of the opening being located approximately above the upper edge of the notch 164. For utilizing the tool 155 to adjust the tension of a spring system such as that shown in FIG. 4, for example, the tool 155 is positioned so that the side plates 157 and 158 straddle the connecting member 73 and the connecting pin 163 engages the slot 83 in the lower edge of the bracket 78. Next the adjustment pin 161 is inserted into one of the adjustment holes 81 in the connection member 73 so that the notch 164 engages the end portions of the pin 161 protruding on each side of the selected one of the holes 81. It is noted that the opening 165 is so located relative to the notch 164 so as to provide clearance for the head of the bolt 82 (FIG. 4) should the adjustment pin be inserted into the adjustment hole immediately beneath the bolt. To adjust the tension of the springs 41 and 42, force is applied to the handle 156 so that the bolt 82 may be removed and reinserted into a different one of the holes 81, thereby providing the desired amount of tension on the springs 41 and 42.

In order to simplify alignment procedures, it may be preferable in some installations to first complete the assembly of the hinging system 10 (FIG. 1) including the connection of the springs 41 and 42 prior to installing the door 14. When this procedure is followed the hinging system is mounted to the jamb 12 with the hardware assuming the normally open position (less spring tension). A mounting member positioning tool 165 shown in FIGS. 21 through 27 is specially adapted to make such installations simple and efficient. Further, as the description proceeds it will be seen that when for any reason it is required to remove and replace the door 14 that with the novel positioning tool 165 this may be accomplished without disassembling and therefore having to readjust the counterbalance hinging system.

The positioning tool 165 comprises a curved handle 166 and a pair of parallel side plates 167 and 168 which are rigidly attached to different faces of the handle 166 by a bolt 169. The bolt 169 also connects one end of a wire cable 170 to the tool 165 and the other end of the cable 170 has an attachment pin 171 connected thereto.

A cross piece assembly indicated generally by the reference numeral 174 comprises a first right angle member 175, a second right angle member 176, and a short plate 177; which assembly may be attached to the handle and the side plates in any conventional manner such as by welding, for example. The angle members 175 and 176 and the plate 177 are joined so as to form a generally rectangular configuration on one side of the handle 166. The short leg of the member 175 extends slightly beyond the member 176 so as to form a protruding portion 178, and the plate 177 extends on the opposite side of the handle 166.

To utilize the mounting tool 165 in the installation of the door 14 to the hinging system 10, for example, the tool 165 is first attached to the inner leg 28 of the angle 30. The attachment step is accomplished by inserting the pin 171 through a hole 179 in the side plates 167 and 168 and through the hole 27 in the angle 30 (FIG. 2). By applying force to the handle 166, the mounting bracket 30 may be positioned to the closed position and retained there by engaging the outside face of the member 176 against the rear surface of the jamb 12, see FIG. 23. It should be noted that the extended portion 178 of the cross piece 174 securely locks the tool in place to prevent accidental disengagement due to the tool sliding out from behind the jamb. The plate 176 may serve as an alignment guide for the door 14, and after the door is in place, the installation may be completed by removing the tool 165 thereby allowing the angle 30 to contact the door 14 and by then securing the angle 30 to the door by any conventional connection means such as lag screws.

It will be understood that although the just described installation procedure was explained for only one set of garage door hinging hardware, that a similar tool and procedure may be utilized in mounting hardware to the opposite side of the garage door 14. The tool utilized on the opposite side may be identical to the tool 165 except that the position of the cross piece assembly 174 on the handle 166 is reversed. For example, referring to FIG. 26, the tool for the other side of the garage door will have the angle members 175 and 176 extending on the left side of the handle 166 and the plate 177 will protrude on the right side.

There accordingly has been described herein new and improved hardware for hinging systems which allows the tension and attachment point of counterbalance springs to be readily adjusted; and devices which may be utilized therewith for easily and efficiently installing the springs into the hinging system, adjusting the tension of the springs, and for positioning a mounting member of the hinging system so that the door may be easily installed thereto.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a hinging system an apparatus for coupling a source of counterbalance force to a power arm having a plurality of holes formed along one end of the arm, said apparatus comprising:

- a pair of side plates with a plurality of ports formed in each of said plates;
- means for rotatably mounting the power arm between first ends of said plates, said mounting means including a fastening device adapted for passing through one of said plurality of ports in each of said side plates and through one of said plurality of holes;
- and means for attaching a second end of said plates to the source of counterbalance force;
- wherein said plurality of ports are so spaced on said plates, relative to the plurality of holes in the power arm, that each one of the plurality of ports may be simultaneously aligned with a different one of the plurality of holes; whereby the position along said power arm at which the power arm is rotatably mounted to said side plates may be varied while the source of counterbalance force is still coupled to the system.

2. An apparatus for coupling at least one counterbalance coil spring to a hinging system, said apparatus comprising:

- a bar member having a plurality of holes formed along a first end thereof and having a second end pivotally connected to the hinging system;
- a pair of side plates with a plurality of ports formed through the surface of each of said plates;
- means for rotatably mounting said bar member between said side plates at first ends of the plates, said mounting means including a fastening device adapted for passing through one of said plurality of ports of each of said side plates and through one of said plurality of holes;
- means for attaching a second end of said plates to a first end of at least one counterbalance spring;
- and means for mounting a second end of the counterbalance spring to the hinging system;

wherein said plurality of ports are so spaced in said side plates, relative to said plurality of holes in said bar, that each of said plurality of ports may be simultaneously aligned with a different one of said plurality of holes at one position of rotation of said bar member; whereby the position along said bar at which said bar is rotatably mounted to said plates may be varied while the counterbalance spring is still attached to the hinging system.

3. The apparatus of claim 2 wherein said attachment means includes a spring connecting device having a first plate with a mounting slot formed in a first end thereof and a second slot transverse to said mounting slot formed in a second end thereof, an elongated member mounted through said transverse slot with said elongated member having a flange formed at each end thereof, whereby said elongated member may be mounted between the coils of the coil spring with said flanges positioned adjacent to the outer surfaces of the coil spring.

4. The apparatus of claim 2 wherein said hinging system includes two coil springs and said attaching means further comprises, a pin mounted between second ends of said side plates; a spring hanger having a mounting hole adapted for mounting said hanger on said pin, and a cross member having a pair of notches with each notch being approximately equally spaced on different sides of said mounting hole; whereby each spring may be secured to said hanger by one spring connecting device attached to each of said springs and disposed in different ones of said notches.

5. The apparatus of claim 4 wherein said spring hanger has a tab formed on each end of said cross member, with said tabs adapted for being positioned transverse to said cross member so as to secure said spring connecting devices on said hanger.

6. The apparatus of claim 2 wherein said mounting means includes a spring fastener; a bracket having a first flange adapted for mounting to the hinging system, and a second flange transverse to said first flange with said second flange having a pair of pins therethrough; a connecting member having two parallel side members with each side member disposed adjacent to the different faces of said second flange and between said pair of pins, said side members having a first end and a plurality of spring tension adjusting holes formed in each member at a second end; means for connecting the first end of the parallel side members of said connecting member to said spring fastener; and a connecting device adapted for being inserted into a selective one of said plurality of adjustment holes in each side member of said connecting member.

7. In a hinging system an apparatus for coupling a source of counterbalance force to a power arm having a plurality of holes formed along one end of the arm, said apparatus comprising:

plate means with a plurality of ports in laterally spaced positions therein;

mounting means for rotatably mounting the power arm on said plate means, said mounting means including a fastening device adapted for passing through one of said plurality of ports and through one of said plurality of holes;

and means for attaching a second end of said plate means to the source of counterbalance force;

wherein said plurality of ports are so spaced on said plate means, relative to the plurality of holes in the power arm, that each one of the plurality of ports may be simultaneously aligned with a different one of the plurality of holes; whereby the position along said power arm at which the power arm is rotatably mounted to said plate means may be varied while the source of counterbalance force is still coupled to the system.

8. The apparatus of claim 7 further comprising an elongated slot formed in the surface of each of said side plates; a spacer member adapted for being adjustably mounted between said slots, and with said slots being positioned in the surfaces of the plates relative to said ports so that when said power arm engages a first surface of the spacer member the ports in said side plates are in substantial alignment with the holes in said power arm.

9. The apparatus in claim 8 wherein said pair of side plates are angularly formed so that when said power arm engages a second surface of said spacer member the angle at which said plates are connected to said power arm is varied.

References Cited

UNITED STATES PATENTS

| | | | |
|---|---|---|---|
| 1,050,746 | 1/1913 | Morgan | 29—227UX |
| 2,194,981 | 3/1940 | La Marsh | 254—10.5 UX |
| 2,673,392 | 3/1954 | McFadden | 29—227 |
| 2,684,238 | 7/1954 | Robinson | 16—1CX |
| 2,885,769 | 5/1959 | Brown | 254—10.5 |
| 3,272,496 | 9/1966 | Halopoff et al. | 267—13X |
| 3,295,157 | 1/1967 | Gluth | 16—180X |

FOREIGN PATENTS

| | | | |
|---|---|---|---|
| 18,090 | 1907 | Great Britain | 29—227 |

DONALD A. GRIFFIN, Primary Examiner

U.S. Cl. X.R.

29—227; 254—10.5; 267—13